US012594837B2

(12) United States Patent　　(10) Patent No.:　US 12,594,837 B2
Kürten　　　　　　　　　　　　　　(45) Date of Patent:　　Apr. 7, 2026

(54) CONNECTION CONNECTOR FOR DRIVE UNITS

(71) Applicant: Siemens Aktiengesellschaft, Munich (DE)

(72) Inventor: Bernd Kürten, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 18/268,682

(22) PCT Filed: Dec. 21, 2021

(86) PCT No.: PCT/EP2021/087087
　　　§ 371 (c)(1),
　　　(2) Date: Jun. 21, 2023

(87) PCT Pub. No.: WO2022/136430
　　　PCT Pub. Date: Jun. 30, 2022

(65) Prior Publication Data
　　　US 2024/0270080 A1　　Aug. 15, 2024

(30) Foreign Application Priority Data
　　Dec. 22, 2020　(EP) ..................................... 20216437

(51) Int. Cl.
　　*B60L 9/04*　　　　(2006.01)
　　*H02J 1/00*　　　　(2006.01)
(52) U.S. Cl.
　　CPC ................ *B60L 9/04* (2013.01); *H02J 1/001* (2020.01); *B60L 2220/42* (2013.01)

(58) Field of Classification Search
　　CPC ........ B60L 2220/42; B60L 9/04; H02J 1/001; Y02T 10/64
　　See application file for complete search history.

(56) References Cited

U.S. PATENT DOCUMENTS 6,209,711 B1 * 4/2001 Koopmann .......... G05D 7/0611
　　　　　　　　　　　　　　　　　　　　198/502.2
9,985,384 B1 * 5/2018 Johnson ................. H01R 13/64
　　　　　　　　　　　(Continued)

FOREIGN PATENT DOCUMENTS

CN　　　　105353319　　　2/2016
DE　　　　19716908　　　10/1998
　　　　　　　(Continued)

OTHER PUBLICATIONS

PCT International Search Report dated Mar. 22, 2022 based on PCT/EP2021/087087 filed Dec. 21, 2021.

*Primary Examiner* — Abdullah A Riyami
*Assistant Examiner* — Thang H Nguyen
(74) *Attorney, Agent, or Firm* — Cozen O'Connor

(57)　　　　　ABSTRACT

A drive system having a plurality of drive units that each have a converter and preferably one motor, wherein the drive system includes an energy supply system that supplies electric energy to the drive units, and a control system that includes a control computer and at least one control line, where the control system transmits control instructions to the drive units, and where the energy supply system and the drive units are releasably connected together via a first respective connection connector, preferably via a plug connection, and the control system and the drive units are releasably connected together via a second respective connection connector, preferably via a plug connection.

16 Claims, 3 Drawing Sheets

(56)    References Cited

U.S. PATENT DOCUMENTS

| | | | |
|---|---|---|---|
| 10,576,832 B2 * | 3/2020 | Fuchs | B60L 50/40 |
| 11,070,004 B2 * | 7/2021 | Lee | H01R 13/6205 |
| 11,377,894 B2 * | 7/2022 | Nagler | E05F 15/611 |
| 2004/0058586 A1 * | 3/2004 | Blutbacher | B60L 58/30 |
| | | | 439/660 |
| 2013/0187600 A1 * | 7/2013 | Gale | H02J 7/02 |
| | | | 320/109 |
| 2015/0357753 A1 * | 12/2015 | Lee | H01R 13/6205 |
| | | | 439/39 |
| 2018/0061463 A1 * | 3/2018 | Park | H01L 23/5383 |
| 2018/0126861 A1 * | 5/2018 | Dörndorfer | B60L 53/34 |
| 2019/0086895 A1 * | 3/2019 | Preisinger | B25J 13/06 |
| 2020/0287323 A1 * | 9/2020 | Lee | H01R 13/642 |
| 2021/0083428 A1 * | 3/2021 | Hallberg | H01R 13/641 |
| 2021/0111659 A1 * | 4/2021 | Akutsu | B62D 5/0403 |

FOREIGN PATENT DOCUMENTS

| | | | | |
|---|---|---|---|---|
| DE | 102010031456 | 1/2012 | | |
| DE | 102017218136 | 4/2019 | | |
| EP | 3579354 | 12/2019 | | |
| EP | 3637596 | 4/2020 | | |
| JP | H11302928 | 11/1999 | | |
| JP | 2014102927 | 6/2014 | | |
| WO | 2012007329 | 1/2012 | | |
| WO | 2020084111 | 4/2020 | | |
| WO | WO-2021023437 A1 * | 2/2021 | | B60L 53/18 |

* cited by examiner

CONNECTION CONNECTOR FOR DRIVE UNITS

CROSS-REFERENCE TO RELATED APPLICATIONS

This is a U.S. national stage of application No. PCT/EP2021/087087 filed 21 Dec. 2021. Priority is claimed on European Application No. 20216437.2 filed 22 Dec. 2020, the content of which is incorporated herein by reference in its entirety.

BACKGROUND OF THE INVENTION

1. Field of the Invention

The invention relates to a drive system having a plurality of drive units, relates to a connection connector for a drive system and relates to a method for producing and separating a connection of the drive unit to an energy supply system and a control system.

2. Description of the Related Art

In the case of decentralized drive systems having a plurality of drive units, such as in the case of conveyor belts, it was previously necessary to shut down the entire drive system in the event of exchanging an individual drive unit. In this case, the entire installation comes to a standstill, which is to be avoided.

DE 197 16 908 A1 discloses an exemplary conventional drive system.

SUMMARY OF THE INVENTION

It is an object of the invention to provide a drive system having a plurality of drive units in which a simple exchange of individual drive units is possible without it being necessary for this purpose for the entire drive system to come to a standstill.

This and other objects and advantages are achieved in accordance with the invention by a drive system having a plurality of drive units, by a connection connector, and by a method for producing and separating a connection of the drive unit.

The drive system in accordance with the invention comprises a plurality of drive units, where the drive units each comprise at least one inverter and one motor. The drive system moreover has an energy supply system that is configured to supply the drive units with electrical energy, and a control system that comprises a control computer and at least one control line, where the control system is configured to transmit control instructions to the drive units.

The drive system is characterized by virtue of the fact that the energy supply system and the drive units are each connected to one another in a detachable manner via a first connection connector, preferably via a plug connection, and that the control system and the drive units are each connected to one another in a detachable manner via a second connection connector, preferably via a plug connection.

With the aid of the inverter, for example, it is possible to control and/or regulate a motor that is connected to the inverter. Here, the inverter can specify, for example, a voltage amplitude or a voltage frequency with which the motor is influenced. The motor can be, for example, an electric motor.

The energy supply system can be an arbitrary voltage source (stationary or mains driven) that can each supply the motor via the inverter of a drive unit with electrical energy in order to render possible an intended use of the motor. The electrical energy supply system is configured to supply a plurality of drive units and is dimensioned accordingly in terms of its power capacity.

The control computer can be any arbitrary computing unit that is configured to generate control commands to the inverter and/or the motor of a respective drive unit and to transmit these control commands to the drive units via a control line, for example, a copper line or a fiber optic.

Drive units having integrated inverters (and where applicable motors) offer the possibility of reducing the external connections to a minimum because, for example, temperature sensors or position encoders can be realized internally. The drive unit only has one connection to the energy supply system and to the control system. In the case of the connection to the energy supply system, it is possible to be a direct current voltage or an alternating current voltage connection (two-phase or three-phase). The connection to the control system can be, for example, purely optical, without an electrical connection existing.

The invention is based on the idea that a detachable connection between the individual drive units and the central energy supply and also controller renders it possible to exchange individual (possibly defective or to be refurbished) drive units without the shut-down of the entire drive system being necessary for this purpose. As a consequence, for example, multiple drive units are connected one behind the other in the drive system (which is regularly applied, for example, in the case of conveyor belts) without an interruption of the operation of the remaining drive units being necessary for the exchange of the drive unit. The first connection connector and the second connection connector in this case remain in the drive system and ensure the proper operation.

The drive unit can also be a combination of an inverter having a photovoltaic unit, such as a solar cell. The advantages of the drive system in accordance with the invention come into effect here in the event of a photovoltaic unit (or the inverter) that is to be repaired or exchanged because it is not necessary to shut down the remaining drive units for this purpose (for example, in the context of a photovoltaic installation having a plurality of photovoltaic units (all inverters)).

The first connection connector and the second connection connector are preferably formed as a common connection connector in order to improve the manageability.

It is preferred that the common connection connector is configured such that, in the event of a detachment of the connection of the common connection connector to the drive unit, the connection between the control system and the drive unit is separated chronologically prior to the connection between the energy supply system and the drive unit. Due to the previous separation of the connection of the drive unit to the control system, the motor or the inverter can be prepared for the impending voltage drop that accompanies the subsequent separation of the connection of the drive unit to the energy supply system. This can generally also be performed manually by a maintenance technician in the case of separated connection connectors (first and second connection connectors). The corresponding configuration of the (common) connection connector however furthermore brings the advantage that the sequence of separating the connection is performed automatically in an electrically advantageous sequence (without causing arcing or the like).

Within the scope of a preferred embodiment of the invention, the first connection connector, the second connection connector or the common connection connector and the drive unit respectively have a complementary connection for an energy supply of the drive unit via a DC voltage power supply and in addition a respective complementary connection for pre-charging the inverter of the drive unit. A pre-charge of the inverter can lead in a manner known per se to a reduction of current peaks as the connection of the inverter to the energy supply system is being produced and thus a destruction or an excessive degeneration of parts of the inverter can be avoided.

It is particularly preferred that the first connection connector and/or the second connection connector or the common connection connector have a detachable connection to the energy supply system and/or to the control system. As a consequence, it is possible to remove a drive unit together with the associated connection connector in a simple manner from an existing drive system or to add a drive unit to an existing drive system. The above-described detachable connections are preferably plug connections, i.e., a connection that comprises a plug and an associated corresponding recess.

The drive system can be configured such that multiple operating steps must be performed in a predetermined sequence to detach the detachable connection or the detachable connections. This brings the advantage that an accidental detachment of the connection (s) can be avoided.

In this case, the inverter and/or the first connection connector and/or the second connection connector and/or the common connection connector can have locking arrangements based on levers and/or leading contacts and/or magnetic locking arrangements such that the multiple operating steps must be performed in the predetermined sequence to detach the detachable connection or the detachable connections. As a consequence, it is possible to specify in a particularly simple and efficient manner the required sequence of the steps that are to be performed.

In one advantageous embodiment of the invention, the drive unit and/or the first connection connector and/or the second connection connector and/or the common connection connector have an optical element, in particular a light-emitting diode, and it is possible to signal via the light-emitting diode that a pre-charging procedure of the inverter has been terminated or a defined state of the drive unit has been reached. An installer of the drive system as a consequence receives information regarding, for example, whether the inverter is ready for connecting the main (energy) supply following the pre-charging procedure. Alternatively, they receive a message regarding whether the connection of the drive unit to the energy supply system can be separated.

The first connection connector and/or the second connection connector or the common connection connector can have a filter element, in particular a capacitor, and/or a shielding in order to increase an electromagnetic compatibility of the connection connector. Measures of this type are likewise possible in the case of the inverter and/or the motor. In addition, measures can be provided on the connections of the connection connector (first, second and/or common), which can protect the electrical contacts of the connection connector against arcing (for example, in the form of a permanent magnet (blowout) or by a corresponding circuitry of the contacts).

The objects and advantages in accordance with the invention are moreover achieved by a connection connector for a drive system in which the connection connector is configured such that, in the event of a detachment of the connection of the common connection connector to the drive unit, the connection between the control system and the drive unit is separated chronologically prior to the connection between the energy supply system and the drive unit.

The connection connector cannot merely be used for a drive system. It is also possible to use the connection connector for a combination of an inverter with a current generating unit, such as a photovoltaic unit.

Advantageously, the connection connector in this case has a connection to the energy supply system and/or to the control system.

It is particularly preferred that the connection connector has a connection, which is complementary to the drive unit, for an energy supply of the drive unit via a DC voltage power supply and in addition has a complementary connection for pre-charging the inverter of the drive unit.

The objects and advantages in accordance with the invention are moreover achieved by a method for producing and separating a connection of a drive unit, which comprises an inverter (and preferably a motor), to an energy supply system that is configured to supply the drive unit with an electrical energy and to a control system that comprises a control computer and at least one control line, where the control system is configured to transmit control instructions to the drive unit. The method comprises:

a) producing a connection of the drive unit to the energy supply system and to the control system by a common connection connector;

b) signaling to the drive unit that a separation from the energy supply system is impending, where the signaling is preferably performed by a separation of the connection of the drive unit to the control system; and c) subsequently separating the connection of the drive unit to the energy supply system by separating the connection of the drive unit to the connection connector.

In this case, during method step a) initially a connection of the energy supply system to a pre-charging connection of the drive unit is preferably produced via the connection connector in order, as described above, to prevent excessively high current peaks and a thus associated wear/destruction of the drive unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described characteristics, features and advantages of this invention and also the manner in which these are achieved become clearer and more explicitly understandable in conjunction with the following description of exemplary embodiments that are further explained in conjunction with the drawings, in which.

DETAILED DESCRIPTION OF THE EXEMPLARY EMBODIMENTS

Figure 1:
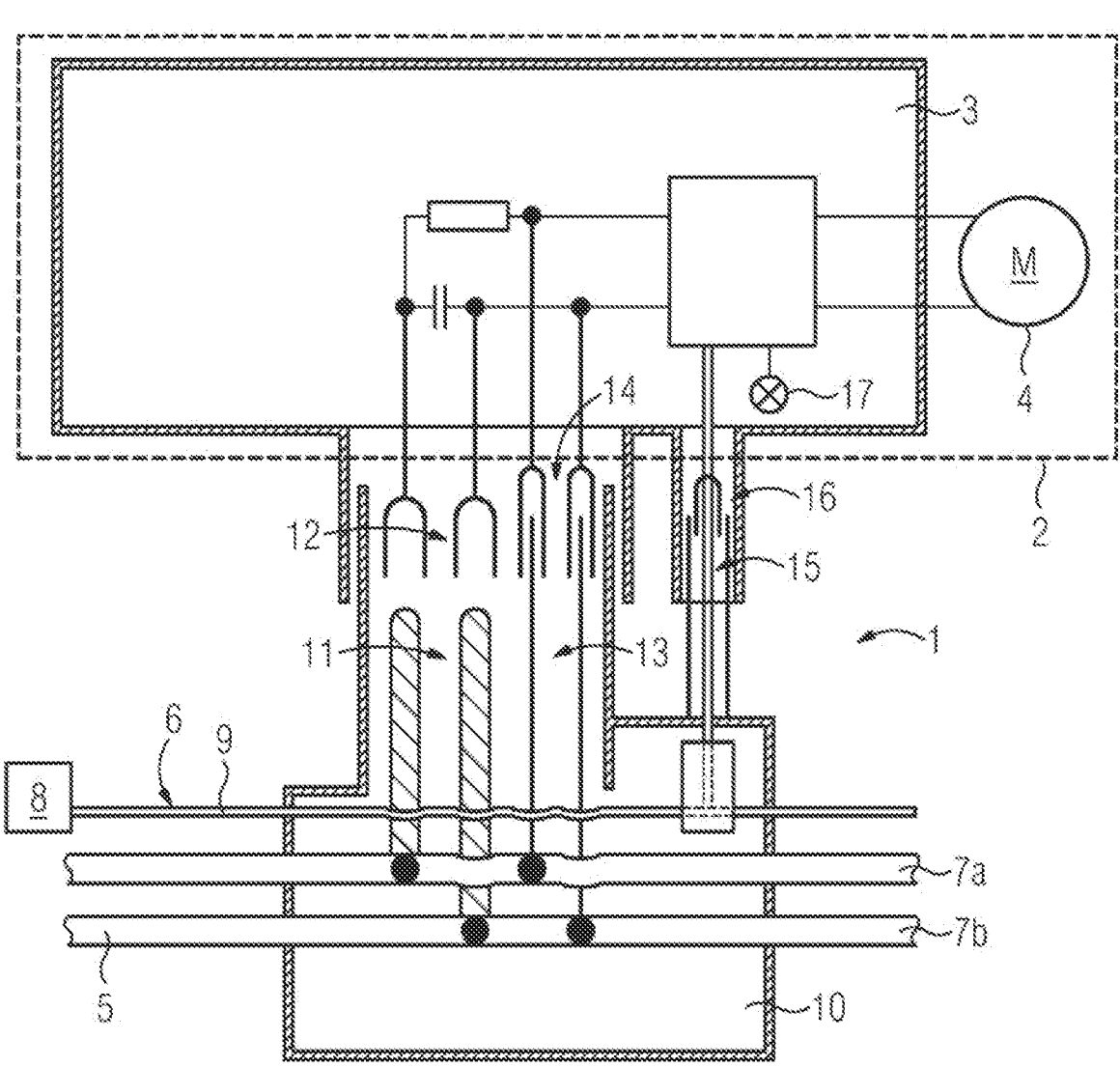
FIG. 1 shows a schematic illustration of a drive system in accordance with the invention having a drive unit and a connection connector.

FIG. 1 illustrates a drive system 1 that has a plurality of drive units of which, for purposes of clarity, only one single drive unit 2 is illustrated. At least one further (not illustrated) drive unit of the drive system 1 is configured in an essentially identical manner to the drive unit 2 that is illustrated in FIG. 1. The drive unit 2 has an inverter 3 and a motor 4.

The drive system 1 furthermore comprises an energy supply system 5 and a control system 6. The energy supply system 5 is configured to supply the drive unit 2 with electrical energy via power lines 7a, 7b (here via a DC voltage power supply). The control system 6 has a control computer 8 and a control line 9.

The energy supply system 5 and the drive unit 2 are connected to one another in a detachable manner via a connection connector 10. For this purpose, the connection connector 10 has a first connection 11 and a second connection 13 that are each formed as a plug or pin.

The first connection 11 of the connection connector 10 is configured such that the first connection 11 can be plugged into a first connection 12 of the drive unit 2, where the first connection 12 is formed as a socket. It is possible via the first connection 11, 12 to transfer an electrical energy so as to drive the motor 4 (main energy supply) from the energy supply system 5 to the drive unit 2.

The second connection 13 of the connection connector 10 is configured such that the second connection 13 can be plugged into a second connection 14 of the drive unit 2, where the second connection 14 is also formed as a socket. It is possible via the second connection 13, 14 to transfer an electrical energy so as to pre-charge the inverter 3 of the drive unit 2 (pre-charging energy supply) from the energy supply system 5 to the drive unit 2. Typically, the connections 13, 14 for the pre-charging are dimensioned as smaller, i.e., the connections 11, 12 for the main energy supply.

The connection connector 10 moreover has a third connection 15 that is formed as a plug or pin and can be plugged into a corresponding connection 16 of the drive unit 2, where the corresponding connection 16 is formed as a socket. The control system 6 can be connected in a detachable manner via this connection 15, 16 to the drive unit 2. The connection is made in the current example via a fiber optic as a control line 9.

A method for producing and separating a connection of the drive unit 2 to the energy supply system 5 and to the control system 6 can be performed as follows. The connection connector 10 that has a connection to the energy supply system 5 and the control system 6 is connected to the drive unit 2. For this purpose, the plugs of the second connection 13 are formed longer than the plugs of the first connection 11, which is apparent in FIG. 1. As the connection connector 10 is being plugged into the drive unit 2 (or more precisely: the plug of the connections 11, 13, 15 into the corresponding connections 12, 14, 16 of the drive unit 2) due to this configuration of the plugs 13 the connection for the pre-charging of the drive unit 2 is produced earlier than the connection to the main energy supply of the motor 4 (this is also referred to as "leading contacts"). As a consequence, pre-charging of the inverter 3 is automatically rendered possible without an installer needing to take any particular care for this purpose which brings with it the advantages that are already described above with regard to the durability and wear of the drive unit 2. The drive unit 3 can signal via a light-emitting diode 17 as an optical element (or optically operating element) that the pre-charging process has been terminated.

In a subsequent step, the drive unit 2 signals that the connection is again to be separated (for example, in the event of a planned exchange of the drive unit 2). For this purpose, the control computer 8 can transmit a signal to the drive unit 2 that causes a transfer of the motor 4 or the inverter 3 into a safe state. It is, however, alternatively also possible for the connection of the drive unit 2 to the control system 6 to be separated, for example, by a corresponding configuration of the connections 15, 16 of the connection connector 10 or the drive unit 2. These can be configured so that, in the event of the connection connector 10 being disengaged/detached from the drive unit 2, the control connection is separated first (in particular prior to the connections 11, 12 of the main energy supply). In other words, the connection connector 2 in this case is configured in manner that in the event of the connection of the connection connector 10 to the drive unit 2 becoming detached, the connection between the control system 6 and the drive unit 2 is separated chronologically prior to the connection between the energy supply system 5 and the drive unit 2.

Subsequently, the connection of the drive unit 2 to the energy supply system 5 is interrupted due to a separation of the connection of the drive unit 2 to the connection connector 10 (due to the connection connector 10 being pulled out of the drive unit 2). Alternative ways to prepare the drive unit 2 are also possible, one of which is explained with the aid of FIG. 3.

Figure 2:
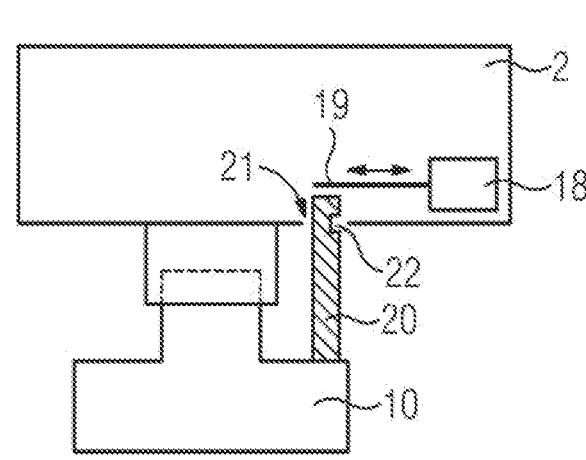
FIG. 2 shows schematic illustration of a first embodiment of a connection connector in accordance with the invention.

FIG. 2 illustrates a connection connector 10 and an associated drive unit 2. The drawing is simplified with respect to FIG. 1 and only represents the aspect that specific operating steps must be performed in a predetermined sequence to detach the connection between the connection connector 10 and the drive unit 2. The drive unit 2, for this purpose, has an (electro) magnetic locking arrangement 18 that can move a pin 19 along an axis. The connection connector 10 has a bolt 20 that is inserted into a recess 21 of the drive unit 2 as the connection connector 10 is being connected to the drive unit 2. A recess 22 is located in the bolt 20 and the pin 19 can be inserted by the locking arrangement 18 into the recess as the connection connector 10 is being connected to the drive unit 2. The bolt 20 can consequently no longer move downward (in the drawing plane) with the result that the connection connector 10 and drive unit 2 are secured against one another. If the intention is to detach the connection, then the locking arrangement 18 receives a corresponding control command (via the control system 6 or by a manual operation on the drive unit 2) and moves the pin 19 out of the recess 22 with the result that the connection connector 10 can subsequently be removed. As a consequence, the drive unit 2 has sufficient time to prepare for the separation of the energy supply system 5.

Figure 3:
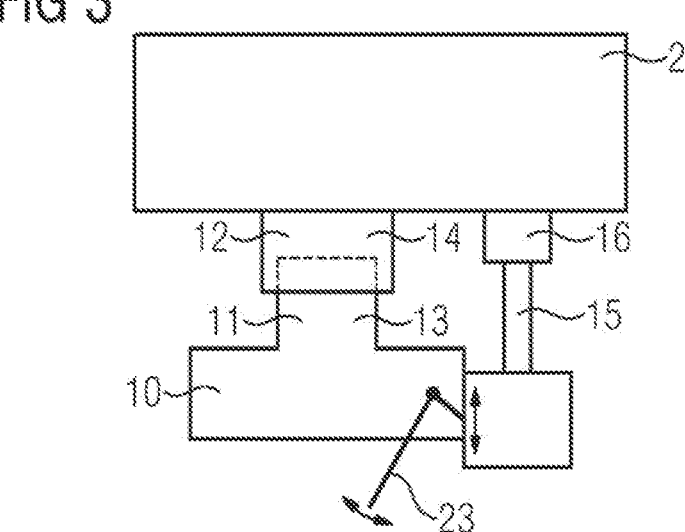
FIG. 3 shows a second embodiment of a connection connector in accordance with the invention in a schematic drawing.

FIG. 3 illustrates an alternative embodiment of a connection connector 10. Here, the connection 15 for connecting the control system 6 to the drive unit 2 is configured so that it can be displaced against the connections 11, 13 for the energy supply. For this purpose, it is possible to use a locking arrangement that is based on a lever 23. Due to this configuration of the connection connector 10, it is possible to ensure that initially the connection of the drive unit 2 to the control system 6 is interrupted in order to signal to the drive unit 2 an impending separation of the connection to the energy supply system 5.

Figure 4:
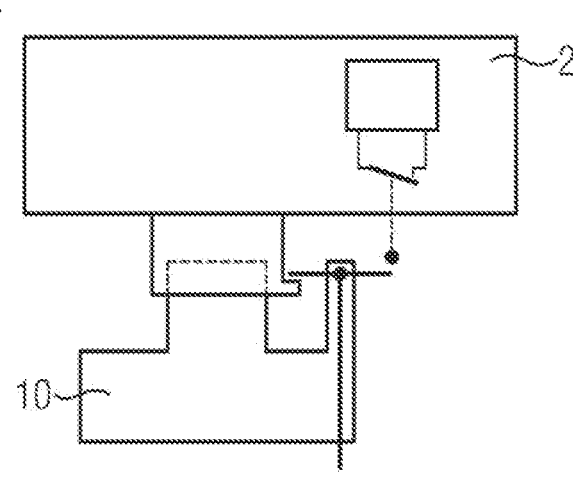
FIG. 4 shows a third embodiment of a connection connector in accordance with the invention in a schematic drawing.

In FIG. 4, the drive unit 2 has an internal controller 24 that can either be addressed directly (via a button or the like) or via the control system 6. The controller 24 can trigger an apparatus 25 that acts magnetically and that can move a locking lever 26 of the connection connector 10 between a locking position and a detaching position via a magnetic pulling force. As a consequence, it is possible to ensure that the connection of the drive unit 2 to the connection connector 10 cannot be detached unintentionally.

Figure 5:
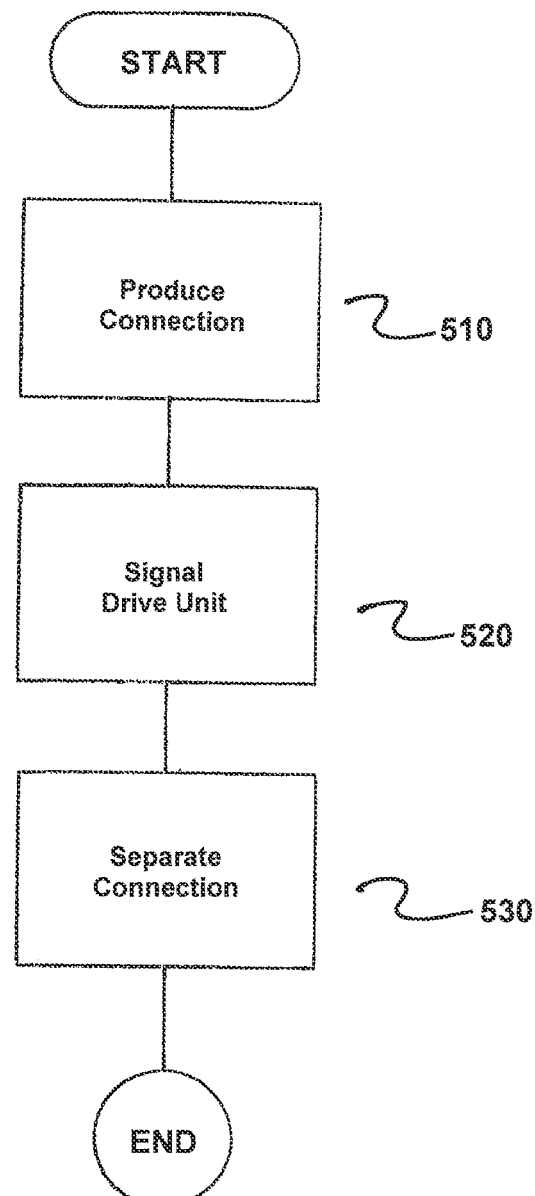
FIG. 5 is a flowchart of the method in accordance with the invention.

FIG. 5 is a flowchart of the method for producing and separating a connection of a drive unit 2, which comprises an inverter 3 and a motor 4, to an energy supply system 5 that supplies the drive unit 2 with electrical energy and to a control system 6 that comprises a control computer 8 and at least one control line 9, where the control system (6) is configured to transmit control instructions to the drive unit 2.

The method comprises a) producing a connection of the drive unit 2 to the energy supply system 5 and to the control system 6 by a common connection connector 10, as indicated in step 510.

Next, b) the drive unit 2 is signaled that a separation from the energy supply system 5 is impending, as indicated in step 520. In accordance with the method, the signaling is performed by a separation of the connection of the drive unit 10 to the control system 6.

Next, c) the connection of the drive unit 2 to the energy supply system 5 is subsequently separated by separating the connection of the drive unit 2 to the connection connector 10, as indicated in step 530.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive system comprising:
   a plurality of drive units which each comprise an inverter and a motor;
   an energy supply system configured to supply the plurality of drive units with an electrical energy; and
   a control system comprising a control computer and at least one control line, the control system being configured to transmit control instructions to the plurality of drive units;

wherein the energy supply system and the plurality of drive units are each interconnected in a detachable manner via a first connection connector comprising a plug connection; and
   wherein the control system and the plurality of drive units are each interconnected in a detachable manner via a second connection connector comprising a second plug connection.

2. The drive system as claimed in claim 1, wherein the first connection connector and the second connection connector are formed as a common connection connector.

3. The drive system as claimed in claim 2, wherein the common connection connector is configured such a manner that, in an event of a detachment of the connection of the common connection connector to a respective drive unit, the connection between the control system and the respective drive unit is separated chronologically prior to the connection between the energy supply system and the respective drive unit.

4. The drive system as claimed in claim 1, wherein the first connection connector, the second connection connector or the common connection connector and a respective drive unit have a respective complementary connection for an energy supply of the respective drive unit via a DC voltage power supply and a further respective complementary connection for pre-charging a respective inverter of the respective drive unit.

5. The drive system as claimed in claim 1, wherein at least one of (i) the first connection connector and (ii) the second connection connector or the common connection connector have a detachable connection to at least one of the energy supply system and the control system.

6. The drive system as claimed in claim 1, wherein the detachable connection is a plug connection.

7. The drive system as claimed in claim 1, wherein multiple operating steps must be performed in a predetermined sequence to detach the detachable connection or the detachable connections.

8. The drive system as claimed in claim 7, wherein at least one of (i) the inverter, the first connection connector, (iii) the second connection connector and (iv) the common connection connector can have locking arrangements based on at least one of leading contacts and magnetic locking arrangements such that the multiple operating steps must be performed in the predetermined sequence to detach the detachable connection or the detachable connections.

9. The drive system as claimed in one claim 1, wherein at least one of (i) a respective drive unit, (ii) the first connection connector, (iii) the second connection connector and (iv) the common connection connector have an optical element comprising a light-emitting diode; and
   wherein the light-emitting diode signals that a pre-charging procedure of the inverter has been terminated or a defined state of the drive unit has been reached.

10. The drive system as claimed in claim 1, wherein at least one of (i) the first connection connector and (ii) the second connection connector or the common connection connector have at least one of a capacitor and a shielding to increase an electromagnetic compatibility.

11. A connection connector for the drive system as claimed in claim 1, wherein the connection connector is configured such that in an event of a detachment of the connection of the common connection connector to a respective drive unit, the connection between the control system and the respective drive unit is separated chronologically prior to the connection between the energy supply system and the respective drive unit.

12. The connection connector as claimed in claim 11, wherein the connection connector includes a detachable connection to at least one of the energy supply system and the control system.

13. The connection connector as claimed in claim 11, further comprising a connection; wherein the connection connector is complementary to drive unit, for an energy supply of the drive unit via a DC voltage power supply and includes a complementary connection for pre-charging the inverter of the drive unit.

14. The connection connector as claimed in claim 12, further comprising a connection; wherein the connection connector is complementary to drive unit, for an energy supply of the drive unit via a DC voltage power supply and includes a complementary connection for pre-charging the inverter of the drive unit.

15. A method for producing and separating a connection of a drive unit, which comprises an inverter and a motor, to an energy supply system which supplies the drive unit with electrical energy and to a control system which comprises a control computer and at least one control line, the control system being configured to transmit control instructions to the drive unit, the method comprising:

a) producing a connection of the drive unit to the energy supply system and to the control system by a common connection connector;

b) signaling to the drive unit that a separation from the energy supply system is impending, the signaling being performed by a separation of the connection of the drive unit to the control system; and c) subsequently separating the connection of the drive unit to the energy supply system by separating the connection of the drive unit to the connection connector.

16. The method as claimed in claim 15, wherein during said producing the connection a connection of the energy supply system to a pre-charging connection of the drive unit is initially produced via the connection connector.

* * * * *